No. 877,906. PATENTED FEB. 4, 1908.
E. E. CLARK.
VALVE FOR PUMPS, &c.
APPLICATION FILED JUNE 11, 1903.
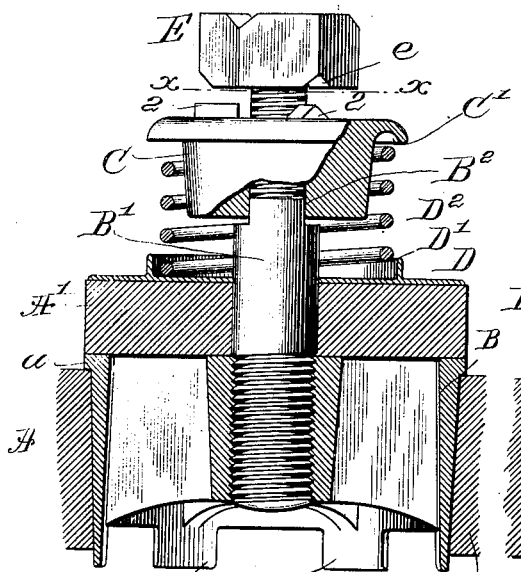
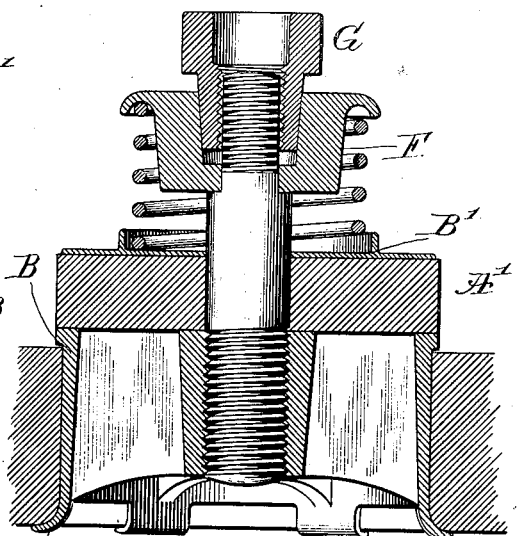
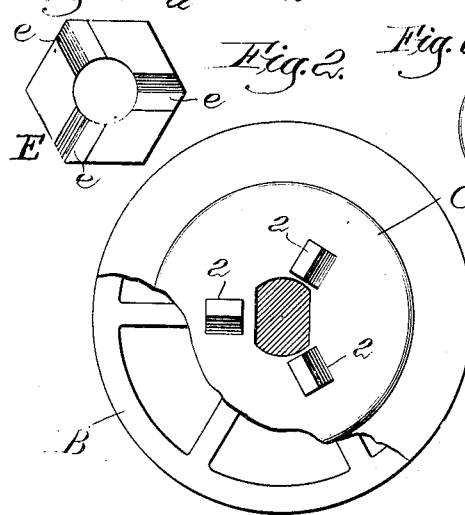
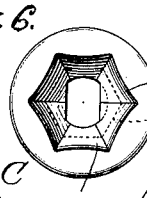
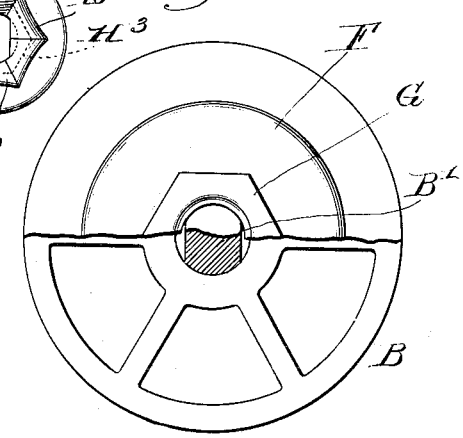
Witnesses.
Thomas J. Drummond.
W. C. Lunsford.
Inventor.
Ezra E. Clark,
by Crosby & Gregory
Attys.

UNITED STATES PATENT OFFICE.

EZRA E. CLARK, OF SPRINGFIELD, MASSACHUSETTS, ASSIGNOR TO CHARLES H. PHINNEY, TRUSTEE, OF CHESTNUT HILL, MASSACHUSETTS.

VALVE FOR PUMPS, &c.

No. 877,906.          Specification of Letters Patent.          Patented Feb. 4, 1908.

Application filed June 11, 1903. Serial No. 160,968.

*To all whom it may concern:*

Be it known that I, EZRA E. CLARK, a citizen of the United States, residing at Springfield, in the county of Hampden and State of Massachusetts, have invented an Improvement in Valves for Pumps, &c., of which the following description, in connection with the accompanying drawings, is a specification, like letters on the drawings representing like parts.

This invention has for its object the production of an improved pump valve for use in underwriters and other pumps.

The valve disk of the valve to be herein described is guided by a valve stem having a detachable guard that acts on the outer end of a cylindrically coiled valve spring, and said guard is prevented from sliding on the stem by means of a locking device that will be described.

Figure 1 shows in partial section a valve illustrating my invention in one of the best forms now known to me, the guard not being seated in operative position, the locking device or nut being represented as out of contact with the guard to better illustrate the projections and depressions; Fig. 2 is a section below the dotted line $x$; Fig. 3 is an underside view of the nut removed from Fig. 1; Fig. 4 is a section showing a modified construction of guard and nut; Fig. 5 is a plan view partially broken away; Fig. 6 is a plan view of another modified form of guard.

In the drawing, A represents part of the body or shell of a pump, and A' the valve disk usually and preferably of india rubber. The valve seat B of non-corrodible metal is supposed to be forced into a bored hole of the shell until the bottom of the shoulder $a$ of the body of the valve seat substantially meets the shell, and thereafter prongs $a'$ at the inner end of the body of the seat are turned outwardly, as shown by full lines Fig. 4. The valve seat will have preferably six ports.

The valve stem B' has screw threads at its inner end that are screwed into the tapped central part of the seat, and the outer end of the stem has screw threads B². In Fig. 1 the upper end of the stem is slabbed off or made other than cylindrical in cross section to present one or more flat faces that will prevent rotation thereon of the guard C, the latter having a central hole of substantially the shape of the cross section of the valve stem where embraced by said guard.

The guard at the underside of its outer flange has an annular groove C', and at its upper side, as shown in Fig. 1, the guard has one or more projections 2, or it might have depressions.

The outer side of the valve has applied to it a thrust plate D shaped to present a space D' to receive the lower end of the spring D².

The outer end of the valve stem, Fig. 1, has applied to it a nut E represented as having at its underside a series of depressions $e$ one for each projection 2 on the guard. It will be understood that the nut might have a projection and enter a depression of the guard.

When the guard is applied to the upper end of the spring, as represented, the guard is prevented from turning due to the irregular cross sectional form of the stem and the hole in the guard, and the depressions of the nut when screwed down upon the valve stem may be made to engage the projections of the guard, thereby locking the nut and guard together, and as the guard is prevented from turning by its irregular fit on the stem, the whole is secure from working off so long as the guard and nut are kept in contact by the force of the spring.

It will be understood that the underside of the guard, Fig. 1, will when the apparatus is in use contact nearly with the shoulder at the upper end of the enlarged central portion of the valve stem, and that in such condition the spring D² will be somewhat compressed, and that the locking device or nut E will be turned down on the threaded stem and left in a position with a depression in the nut engaging a projection of the guard. The parts are represented in Fig. 2 in an inoperative position merely to better illustrate the projections and depressions.

In the modifications Figs. 4 and 5, the guard therein marked F has a tapering recess in which fits the tapered sleeve-like portion $g$ of the nut G.

The upper end of the stem B' is slabbed off as provided for in Figs. 1 and 2, and the guard provided with a hole of corresponding shape, thus affording a positive means for preventing the guard from rotating on the stem. In this modification the action of the spring or of the valve at each movement of its seat tends to drive these taper fits together, thus producing a frictional resistance to the turning of the nut in the guard, and as the guard cannot turn, the two parts are secure against working off.

In the modification Fig. 6 the guard is provided with a series of faces 10 that co-act with the slab-faces of a nut like H³. The opening in the guard is in the shape of an inverted pyramid having, as shown, six sides.

Having described my invention, what I claim and desire to secure by Letters Patent is:—

1. A ported valve seat, a central valve stem, a valve encircling and guided by said stem, a guard mounted on said stem, a spring interposed between said guard and said valve, said guard being formed with a polygonal hole and said stem throughout the part on which the guard slides being of corresponding polygonal form, a locking nut screw-threaded onto the end of the stem, means for preventing rotation of the nut and the guard when in engagement.

2. A ported valve seat, a central valve stem, a valve encircling and guided by said stem, a guard mounted on said stem, a spring interposed between said guard and said valve, said guard being formed with a polygonal hole and said stem throughout the part on which the guard slides being of corresponding polygonal form, a locking nut screw-threaded on said stem, coöperating projections and depressions located on the nut and the guard, whereby the nut is prevented from rotation and the position of the guard is secured.

3. In a device of the character described, the combination of a valve seat, a valve located on said seat, a spring to hold the valve to its seat, a valve stem, a collar on said stem, a nut threaded to said stem, means on the stem to normally hold said collar from turning on the same, and means in said collar for engaging and holding said nut from turning.

4. In a device of the character described, the combination with a valve seat, of a valve located on said seat, a spring to hold the valve to its seat, a valve stem, a collar normally held from turning on said stem, and a nut threaded on said stem and arranged to engage said collar to hold said nut from turning, one of said engaging parts, namely the collar and nut, being provided with a recess and the other constructed to engage said recess.

In testimony whereof, I have signed my name to this specification, in the presence of two subscribing witnesses.

EZRA E. CLARK.

Witnesses:
GEO. W. GREGORY,
MARGARET A. DUNN.